United States Patent
Kanchwalla et al.

(12)

(10) Patent No.: US 7,117,215 B1
(45) Date of Patent: Oct. 3, 2006

(54) METHOD AND APPARATUS FOR TRANSPORTING DATA FOR DATA WAREHOUSING APPLICATIONS THAT INCORPORATES ANALYTIC DATA INTERFACE

(75) Inventors: Firoz Kanchwalla, Sunnyvale, CA (US); David Lyle, Los Gatos, CA (US); Sujit Bais, Sunnyvale, CA (US); Srinivasan Maadapusi, Sunnyvale, CA (US); Amol Dongre, Sunnyvale, CA (US); Premkumar Somakumar, Sunnyvale, CA (US)

(73) Assignee: Informatica Corporation, Redwood City, CA (US)

( * ) Notice: Subject to any disclaimer, the term of this patent is extended or adjusted under 35 U.S.C. 154(b) by 70 days.

(21) Appl. No.: 09/877,370

(22) Filed: Jun. 7, 2001

(51) Int. Cl.
*G06F 17/30* (2006.01)
(52) U.S. Cl. .................. 707/100; 707/101; 707/102
(58) Field of Classification Search .................. 707/1, 707/3, 4, 6, 7, 9, 10, 100, 101, 102, 200–205; 705/4
See application file for complete search history.

(56) References Cited

U.S. PATENT DOCUMENTS

| | | | |
|---|---|---|---|
| 5,403,147 A | 4/1995 | Tanaka |
| 5,404,513 A | 4/1995 | Powers et al. |
| 5,405,531 A | 4/1995 | Hitzman et al. |
| 5,410,688 A | 4/1995 | Williams et al. |
| 5,420,688 A | 5/1995 | Farah |
| 5,455,945 A | 10/1995 | Vanderdrift |
| 5,511,190 A | 4/1996 | Sharma et al. |
| 5,519,859 A | 5/1996 | Grace |
| 5,537,589 A | 7/1996 | Dalal |
| 5,563,999 A | 10/1996 | Yaksich et al. |
| 5,603,024 A | 2/1997 | Goldring |
| 5,655,101 A | 8/1997 | O'Farrell et al. |
| 5,675,785 A | 10/1997 | Hall et al. |
| 5,689,566 A | 11/1997 | Nguyen |
| 5,692,181 A | 11/1997 | Anand et al. |

(Continued)

FOREIGN PATENT DOCUMENTS

EP 0987868 A3 3/2000

(Continued)

OTHER PUBLICATIONS

24×7 The Magazine of Nonstop Computing, "Compaq's Zero Latency Enterprise Initiative," vol. 1, No. 2, Oct. 2000, pp. 1-25.

(Continued)

*Primary Examiner*—Jeffrey Gaffin
*Assistant Examiner*—Neveen Abel-Jalil

(57) ABSTRACT

A method and apparatus for transporting data for a data warehousing application. Data is extracted from one or more source containing data having a standard data structure and is translated into data that contains meaningful business terms. The translated data is then stored. In the present embodiment, an analytic business component is operable for extracting data from the source, translating the extracted data and for storing the translated data into a staging area. The translated data is then processed to obtain data having a common structure. In the present embodiment, a source adapter processes the translated data to obtain data having a common structure. The data having a common structure is then transformed into a format suitable for loading into a data mart. In the present embodiment, an analytic data interface receives the data having a common structure and transforms the data for loading into a data warehouse. The data is then stored in a data warehouse.

8 Claims, 4 Drawing Sheets

U.S. PATENT DOCUMENTS

| | | | |
|---|---|---|---|
| 5,706,495 A | 1/1998 | Chadha et al. | |
| 5,708,828 A | 1/1998 | Coleman | |
| 5,713,020 A | 1/1998 | Reiter et al. | |
| 5,721,903 A | 2/1998 | Anand et al. | |
| 5,721,911 A | 2/1998 | Ha et al. | |
| 5,778,355 A | 7/1998 | Boyer et al. | |
| 5,781,911 A | 7/1998 | Young et al. | 707/201 |
| 5,787,415 A | 7/1998 | Jacobson et al. | |
| 5,794,030 A | 8/1998 | Morsi et al. | |
| 5,794,228 A | 8/1998 | French et al. | |
| 5,794,229 A | 8/1998 | French et al. | |
| 5,794,246 A | 8/1998 | Sankaran et al. | |
| 5,799,310 A | 8/1998 | Anderson et al. | |
| 5,806,060 A | 9/1998 | Borgida et al. | |
| 5,822,751 A | 10/1998 | Gray et al. | |
| 5,826,258 A | 10/1998 | Gupta | |
| 5,832,496 A | 11/1998 | Anand et al. | |
| 5,842,213 A | 11/1998 | Odom et al. | |
| 5,848,415 A | 12/1998 | Guck | |
| 5,854,890 A | 12/1998 | Ramachandran et al. | |
| 5,857,197 A | 1/1999 | Mullins | |
| 5,870,746 A | 2/1999 | Knutson et al. | |
| 5,870,747 A | 2/1999 | Sundaresan | |
| 5,873,102 A | 2/1999 | Bridge, Jr. et al. | |
| 5,884,262 A | 3/1999 | Wise et al. | |
| 5,898,431 A | 4/1999 | Bayles et al. | |
| 5,915,019 A | 6/1999 | Ginter et al. | |
| 5,933,796 A | 8/1999 | Ashida et al. | |
| 5,970,464 A * | 10/1999 | Apte et al. | 705/4 |
| 5,982,890 A | 11/1999 | Akatsu | |
| 5,987,454 A | 11/1999 | Hobbs | |
| 5,991,742 A | 11/1999 | Tran | |
| 6,002,402 A | 12/1999 | Schacher | |
| 6,003,024 A * | 12/1999 | Bair et al. | 707/3 |
| 6,014,670 A | 1/2000 | Zamanian et al. | |
| 6,026,388 A | 2/2000 | Liddy et al. | |
| 6,032,145 A | 2/2000 | Beall et al. | |
| 6,032,158 A * | 2/2000 | Mukhopadhyay et al. | 707/201 |
| 6,044,374 A | 3/2000 | Nesamoney et al. | |
| 6,065,007 A | 5/2000 | Muthukrishnan et al. | |
| 6,072,492 A | 6/2000 | Schagen et al. | |
| 6,078,994 A | 6/2000 | Carey | |
| 6,119,167 A | 9/2000 | Boyle et al. | |
| 6,122,628 A | 9/2000 | Castelli et al. | |
| 6,128,624 A | 10/2000 | Papierniak et al. | |
| 6,141,699 A | 10/2000 | Luzzi et al. | |
| 6,151,584 A | 11/2000 | Papierniak et al. | |
| 6,151,601 A * | 11/2000 | Papierniak et al. | 707/10 |
| 6,173,310 B1 | 1/2001 | Yost et al. | |
| 6,192,364 B1 | 2/2001 | Baclawski | |
| 6,205,472 B1 | 3/2001 | Gilmour | |
| 6,208,990 B1 | 3/2001 | Suresh et al. | |
| 6,216,125 B1 | 4/2001 | Johnson | |
| 6,233,575 B1 | 5/2001 | Agrawal et al. | |
| 6,268,663 B1 | 7/2001 | Itabashi et al. | |
| 6,269,336 B1 | 7/2001 | Itabashi et al. | |
| 6,269,369 B1 | 7/2001 | Robertson | |
| 6,262,598 B1 | 8/2001 | Lapp et al. | |
| 6,272,485 B1 | 8/2001 | Sragner | |
| 6,292,657 B1 | 9/2001 | Laursen et al. | |
| 6,308,203 B1 | 10/2001 | Itabashi et al. | |
| 6,336,137 B1 | 1/2002 | Lee et al. | |
| 6,339,775 B1 | 1/2002 | Zamanian et al. | |
| 6,369,840 B1 | 4/2002 | Barnett et al. | |
| 6,385,604 B1 | 5/2002 | Bakalash et al. | |
| 6,393,386 B1 | 5/2002 | Zager et al. | |
| 6,404,884 B1 | 6/2002 | Marwell et al. | |
| 6,408,292 B1 | 6/2002 | Bakalash et al. | |
| 6,411,936 B1 | 6/2002 | Sanders | |
| 6,418,200 B1 | 7/2002 | Ciccolella et al. | |
| 6,421,781 B1 | 7/2002 | Fox et al. | |
| 6,424,426 B1 | 7/2002 | Henry | |
| 6,430,624 B1 | 8/2002 | Jamtgaard et al. | |
| 6,438,522 B1 | 8/2002 | Minowa et al. | |
| 6,438,552 B1 | 8/2002 | Tate | |
| 6,446,059 B1 | 9/2002 | Berger et al. | |
| 6,446,062 B1 | 9/2002 | Levine et al. | |
| 6,446,096 B1 | 9/2002 | Holland et al. | |
| 6,449,619 B1 | 9/2002 | Colliat et al. | |
| 6,457,030 B1 | 9/2002 | Adams et al. | |
| 6,466,969 B1 | 10/2002 | Bunney et al. | |
| 6,477,525 B1 * | 11/2002 | Bello et al. | 707/3 |
| 6,487,584 B1 | 11/2002 | Bunney | |
| 6,493,800 B1 | 12/2002 | Blumrich | |
| 6,502,101 B1 | 12/2002 | Verprauskus et al. | |
| 6,535,872 B1 | 3/2003 | Castelli et al. | |
| 6,539,359 B1 | 3/2003 | Ladd et al. | |
| 6,549,910 B1 | 4/2003 | Tate | |
| 6,549,937 B1 | 4/2003 | Auerbach et al. | |
| 6,553,366 B1 | 4/2003 | Miller et al. | |
| 6,563,912 B1 | 5/2003 | Dorfman et al. | |
| 6,564,264 B1 | 5/2003 | Creswell et al. | |
| 6,574,599 B1 | 6/2003 | Lim et al. | |
| 6,581,062 B1 | 6/2003 | Draper et al. | |
| 6,587,857 B1 * | 7/2003 | Carothers et al. | 707/102 |
| 6,591,304 B1 | 7/2003 | Sitaraman et al. | |
| 6,601,062 B1 | 7/2003 | Deshpande et al. | |
| 6,616,701 B1 | 9/2003 | Doyle | |
| 6,629,102 B1 | 9/2003 | Malloy et al. | |
| 6,631,497 B1 | 10/2003 | Jamshidi et al. | |
| 6,636,870 B1 | 10/2003 | Roccaforte | |
| 6,671,689 B1 | 12/2003 | Papierniak | |
| 6,721,728 B1 | 4/2004 | McGreevy | |
| 2002/0035565 A1 | 3/2002 | Shah et al. | |
| 2002/0056081 A1 | 5/2002 | Morley et al. | |
| 2002/0059267 A1 | 5/2002 | Shah et al. | |
| 2002/0077787 A1 | 6/2002 | Rappaport et al. | |
| 2002/0099691 A1 | 7/2002 | Lore et al. | |
| 2002/0112237 A1 | 8/2002 | Kelts | |
| 2002/0161770 A1 | 10/2002 | Shapiro et al. | |
| 2003/0172247 A1 | 9/2003 | Bayer et al. | |

FOREIGN PATENT DOCUMENTS

| | | |
|---|---|---|
| EP | 1043671 A2 | 10/2000 |
| EP | 1164511 A2 * | 12/2001 |
| GB | 2350758 | 12/2000 |
| GB | 2357596 | 6/2001 |
| WO | WO 99/24922 | 5/1999 |
| WO | WO 00/04466 | 1/2000 |
| WO | WO 00/08581 | 2/2000 |
| WO | WO 00/77707 | 12/2000 |
| WO | WO 01/18728 | 3/2001 |
| WO | WO 01/20438 | 3/2001 |
| WO | WO 01/24040 | 5/2001 |
| WO | WO 02/44953 | 6/2002 |

OTHER PUBLICATIONS

"A Process for Selective Routing of Servlet Transcoding Modules," IBM Technical Disclosure Bulletin, vol. 42, Issue 422, Jun. 1999 UK.

Multi-Modal Data Access Research Disclosure, Kenneth Mason Publications, Hampshire, GB, No. 426, Oct. 1999, pp. 133-1386.

"Parameterized XSL Style Sheets," Research Disclosure, vol. 42, No. 423, Jul. 1, 1999, Havant, UK, Article No. 423110.

Anand, V. J. et al. "Data Warehouse Architecture for DDS Applications." Australian Journal of Information Systems. Sep. 1996, AJIS Publishing, Australia, vol. 4, No. 1, pp. 43-53.

Ballinger, C. et al., "Born to be Parallel. Why Parallel Origins Give Teradata an Enduring Performance Edge," Bulletin of the Technical Committee on Data Engineering, vol. 20, No. 2, Jun.. 1997, IEEE Comput. Soc., Los Alamitos, CA, US.

Barrett R. et al., "Intermediaries: An Approach to Manipulating Information Streams," IBM Systems Journal, IBM Corp., Armonk, New York, U.S. vol. 38, No. 4, 1999, pp. 629-641.

Bellatreche, L. et al., "OLAP Query Processing for Partitioned Data Warehouses," Proceedings 1999 Int'l. Symposium on Database Applications in Non-Traditional Environments (Dante'99) (CAT. No. PR00496), Kyoto, JP, Nov. 28-30, 1999, pp. 35-42, IEEE Comput. Soc., Los Alamitos, CA US ISBN: 0-7695-0496-5.

Bello, R.G. et al. et al., "Materialized Views in Oracle," Proceedings of the Int'l. Conf. On Very Large Data Bases, NY, Aug. 24, 1998, pp. 659-664.

Chamberlin D. et al., "A Complete Guide to DB2 Universal Database," 1992, pp. 659-600.

Chan, R. "12 Steps of Creating a Successful Data Warehouse," Proceedings of the 8th International Database Workshop (Industrial Volume), Proceedings of the 8th International Hong Kong Computer Society Database Workshop, Data Mining, Data Warehousing and CLI, pp. 227-248, ISBN 981-3083-53-0, 1997, Singapore, Springer-Verlag Singapore, Singapore.

Chaudhuri, S. et al., "An Overview of Data Warehousing and OLAP Technology," SIGMOD Record, Sigmod, New York, No. US, vol. 2, No. 1, Mar. 1997, pp. 65-74.

Curley, K. et al. "The Rationale for Developing a Corporate Data Warehouse and the Development of a Model for Sharing Data in a Data Warehouse Environment." OOIS '95. 1995 International Conference on Object Oriented Information Systems Proceedings, Proceedings of 1995, International Conference on Object Oriented Information Systems, Dublin, Ireland, Dec. 18-20, 1995, pp. 351-366, Berlin Germany, Springer-Verlag, Germany.

Datta, A., et al., "A Case for Parallelism in Data Warehousing and OLAP," Ninth Int'l. Workshop on Database and Expert Systems Applications, Vienna, AT, IEEE Comput. Soc., Los Alamitos, CA, US, Aug. 26, 1998, pp. 226-231.

Dawson F. et al., 'RFC 2426 vCard MIME Directory Profile, Network Working Group, Request for Comments 2426, Sep. 1998.

Deutsch A. et al., "Storing Semistructured Data with STORED," ACM SIGMOD Record, Proceedings of the 1999 ACM SIGMOD International Conference on Management of Data, Jun. 1999, vol., 28, Issue 2.

Duncan, K., et al., "Optimizing the Data Warehousing Environment for Change: the Persistent Staging Area," Cutter IT Journal, Jun. 1999, Cutter Inf. Corp. USA, vol. 12, No. 6, pp. 28-35.

Fernandez M. et al., "SilkRoute: Trading Between Relations and XML," WWW9/Computer Networks, 33(1-6), pp. 723-745, 2000.

Florescu D. et al., "A Performance Evaluation of Alternative Mapping Schemes for Storing SML in a Relational Database," Technic Report 3680, INRIA, 1999.

Freytag, C. et al., "Resource Adaptive WWW access for Mobile Applications," Computers and Graphics, Pergamon Press Ltd., Oxford, GB, vol. 23, No. 6, Dec. 1999, pp. 841-848.

Fry, J.P, "Conversion Technology, An Assessment," ACM SIGMIS Database, vol. 12-13, No. 4-1, Jul. 1981, pp. 39-61.

Hammer, J. et al., "Extracting Semistructured Information From the Web," Proceedings of the Workshop on Management of Semi-structured Data, Mar. 16, 1997, pp. 1-25.

Hori M. et al., "Annotation-Based Web Content Transcoding," Computer Networks, Elsevier Science Publishers B.V., Amsterdam NL., vol. 33, No. 106, Jun. 2000, pp. 197-211.

Housel B. et al., "A High-Level Data Manipulation Language for Hierarchical Data Structures," International Conference on Management of Data, 1976, pp. 155-169.

Informatica Press Releases, "Informatica Delivers Industry's First Synchronized Data Marts With Newest Version of Powermart Suite," http://www.informatica.com/syndata—052798.html. pp. 1-4, May 27, 1997.

Informatica Press Releases, "Informatica Unveils Architecture for Networking Multiple Data Marts Into an Enterprise-Wide Data Warehouse," http://www.informatica.com/edm—082697.html, pp. 1-4, Aug. 26, 1997.

Jaczynski, M. et al., "Broadway: A Case-Based System for Cooperative Information Browsing on the World Wide Web," Collaboration Between Human and Artificial Societies, Online 1999.

Jones, Katherine, "An Introduction to Data Warehousing: What are the Implications for the Newtork," 1998, International Journal of Network Management, vol. 8, pp. 42-56.

Juhne, J., et al., "Ariadne: a Java-Based Guided Tour System for The World Wide Web," Computer Networks and ISDN Systems, North Holland Publishing, Amsterdam, NL, vol. 30, No. 107, Apr. 1, 1998, pp. 131-139.

Kim, W., "On Optimizing an SQL-Like Nested Query," ACM Transactions on Database Systems, Association for Computing Machinery, New York, US, vol. 7, No. 3, Sep. 1, 1982, pp. 443-469.

Kitayama, F. et al., "Design of a Framework for Dynamic Content Adaptation to Web-enabled Terminals and Enterprise Applications," Software Engineering Conference, 1999. Proceedings Sixth Asian Pacific Takamatsu, Japan, Dec. 7-10, 1999, Los Alamitos, CA, US.

Kovacs, L. et al., Aqua: An Advanced User Interface for the Dienst Digital.

Library System, 8th Delos Workshop: User Interfaces for Digital Libraries, Online, Oct. 21-23, 1998, Sweden, p. 2.

Lum, V. Y. et al., "A General Methodology for Data Conversion and Restructuring," IBM Journal of Research and Development, IBM Corporation, Armonk, US, vol. 20, No. 5, Sep. 1, 1976, pp. 483-497.

Makpangou M. et al., "Replicated Directory Service for Weakly Consistent Distributed Caches," INRIA SOR group-78143 Le Chesnay Cedex, France.

Mohania M. et al.: "Advances and Research Directions in Data Warehousing Technology," Ajis. Australian Journal of Information Systems, Wollongong, Au. vol. 7, No. 1, Sep. 1999, pp. 41-59.

Mumick I. S. et al. "Maintenance of Data Cubes and Summary Tables in a Warehouse," SIGMOD 1997. ACM SIGMOD International Conference on Management of Data, Tucson, AZ, USA, May 13-15, 1997, vol. 26, No. 2, pp. 100-111, XP002074807, Jun. 1997, ACM, USA.

Mumick, I., "Magic is Relevant," Sigmond Record, Sigmond, New York, NY, US, vol. 19, No. 2, Jun. 1, 1990, pp. 247-258.

Rodriguez J. et al., "IBM WebSphere Transcoding Publisher V1:1: Extending Web Applications to the Pervasive World," (http://ibm.com/redbooks), Jul. 2000, pp. 1039.

Rousskov A., "Cache Digests," Computer Networks and ISDN Systems, 30 (1998) 2144-2168.

Roy P. et al., "Don'Trash Your Intermediate Results, Cach'em," Technical Report, Online, Mar. 2, 2000, pp. 1-22.

Schneiderman B. et al., "An Architecture for Automatic Relational Database System Conversion," ACM Transactions on Database Systems, vol. 7, No. 2, 1982.

Schneier, B., "Applied Cryptography, Second Edition," 1996, pp. 189-196, 226-227.

Shanmugasundaram J. et al., "Relational Databases for Querying SML Documents: Limitations and Opportunities," Proc. Of VLBD, pp. 302-314, 1999.

Seshadri, P. et al., "SQLServer for Windows CE-A Database Engine For Mobile And Embedded Platforms," Data Engineering 2000. Proceedings 16th International Conference in San Diego, CA, US, Feb. 29, 2000, IEE Computer Soc., US, Feb. 29, 2000, pp. 642-644.

Shimura T. et al., "Storage and Retrieval of XML Documents Using Object-Relational Databases," Proc. Of DEXA. pp. 206-217, 1999.

Shu N. et al., "Convert: A High Level Translation Definition Language for Data Conversion," Communications of the ACM, vol. 18, No. 10, Oct. 1975, pp. 557-567.

Shu N. et al., "Convert: A High Level Translation Definition Language for Data Conversion," Proceedings of the 1975 ACM SIGMOD International Conference on Management of Data, May 1975, p. 111.

Shu N. et al., "Express: A Data EXtraction, Processing and REStructuring System," ACM Transactions on Database Systems, vol. 2, No. 2, Jun. 1977, pp. 134-174.

Shu, Nan, "Automatic Data Transformation and Restructuring," IEEE. 1987, pp. 173-180.

Squire, C., "Data Extraction and Transformation of the Data Warehouse," ACM Proceedings of SIGMOD. International Conf. On Management of Data, vol. 24, No. 1, Mar. 1, 1995, pp. 446.

Weyman, P. J., "The Case for a Process-Driven Approach to Data Warehousing," Database and Network Journal, A.P. Publications, London, FB. vol. 27, No. 1, Feb. 1, 1997, pp. 3-6.

White, C., "Data Warehousing: Cleaning and Transforming Data," INFO DB, vol. 10, No. 6, Apr. 1997, pp. 11-12.

White, C., "Managing Data Transformations," byte, McGraw-Hill Inc., St. Peterborough US, vol. 22, No. 12, Dec. 1, 1997, pp. 53-54.

Informatica Corporation, Release Notes, PowerCenter 1.6, PowerMart 4.6, Aug. 1999, pp. 1-30.

Informatica Corporation, User Guide, PowerCenter 1.6, PowerMart 4.6, Jul. 1999, pp. i-xxvii and 144-186 (Table of Contents, Preface, Chapters 6 & 7).

* cited by examiner

METHOD AND APPARATUS FOR TRANSPORTING DATA FOR DATA WAREHOUSING APPLICATIONS THAT INCORPORATES ANALYTIC DATA INTERFACE

FIELD OF THE INVENTION

The present invention relates to database systems. More particularly, the present invention pertains to an apparatus and method for transporting data for a data warehousing application.

BACKGROUND OF THE INVENTION

Due to the increased amounts of data being stored and processed today, operational databases are constructed, categorized, and formatted in a manner conducive for maximum throughput, access time, and storage capacity. Unfortunately, the raw data found in these operational databases often exist as rows and columns of numbers and code which appears bewildering and incomprehensible to business analysts and decision makers. Furthermore, the scope and vastness of the raw data stored in modern databases renders it harder to analyze. Hence, applications were developed in an effort to help interpret, analyze, and compile the data so that a business analyst may readily and easily understand it. This is accomplished by mapping, sorting, and summarizing the raw data before it is presented for display. Thereby, individuals can now interpret the data and make key decisions based thereon.

Extracting raw data from one or more operational databases and transforming it into useful information is the function of data "warehouses" and data "marts." In data warehouses and data marts, the data is structured to satisfy decision support roles rather than operational needs. Before the data is loaded into the target data warehouse or data mart, the corresponding source data from an operational database is filtered to remove extraneous and erroneous records; cryptic and conflicting codes are resolved; raw data is translated into something more meaningful; and summary data that is useful for decision support, trend analysis or other end-user needs is pre-calculated. In the end, the data warehouse is comprised of an analytical database containing data useful for decision support. A data mart is similar to a data warehouse, except that it contains a subset of corporate data for a single aspect of business, such as finance, sales, inventory, or human resources. With data warehouses and data marts, useful information is retained at the disposal of the decision-makers.

However, establishing a structure for transporting (extracting, transporting and loading) data from an operational database or databases into a structure that can be used for data warehousing applications is quite time consuming. In many instances many months of man-hours are required to define and program a suitable structure for transporting data from an operational database(s) into a format suitable for data warehousing applications.

The complexities in designing a data model for transporting data from an operational database into target tables in a data warehouse are not simply technical problems. They also involve complex business semantic problems.

Recently, many operational databases have begun to use standardized database structures. Several companies have recently created Business Application Programming Interfaces for getting data into and out of business databases that use these standardized database structures. Business application programming interfaces are effective for getting information into and out of a business database. However, the user must still perform the process of defining and programming for data transport in order to obtain output that is suitable for use as input to a data warehousing application. This is expensive and time consuming. In addition, these business application programming interfaces require extensive knowledge and programming to learn and use.

The time and cost for defining and programming such that the data is suitable for use as input to a data warehousing application is particularly problematic for companies that use multiple different operational databases. More particularly, the process of defining and programming for data transport must be repeated for each different operational database. That is, for example, if a company has both a SAP database and an Oracle database, the process of defining and programming for data transport must be performed for both databases and the process is unique to each database.

What is needed is a method and apparatus that allows for transporting data such that the data can be used in data warehousing applications. In addition, a method and apparatus is needed that meets that above need and that takes advantage of the standardization of database components. Moreover, a method and apparatus is needed that reduces the time required to define and program data transport for data warehousing applications. The present invention provides a method and apparatus that meets the above needs.

SUMMARY OF THE INVENTION

The present invention includes a method and apparatus for transporting data for a data warehousing application. More particularly, the present invention introduces a method and a data transport process architecture that uses standardized structures of different types of source databases to achieve source-specific configuration for extraction, transformation, and loading in a data warehousing application.

A system is disclosed that includes an analytic business component that translates operational data from data source having a standardized data structure. The system also includes a staging area for storing the translated data. In addition, the system includes a source adapter that is coupled to the staging area. An analytic data interface couples to the source adapter and receives the data having a common structure and transforms the data for loading into a data warehouse.

In one embodiment of the present invention, data is extracted from one or more source containing data having a standard data structure and is translated into data that contains meaningful business terms. The translated data is then stored. In the present embodiment, the analytic business component is operable for extracting data from the source, translating the extracted data and for storing the translated data into a staging area.

The translated data is then processed to obtain data having a common structure. In the present embodiment, a source adapter processes the translated data to obtain data having a common structure.

The data having a common structure is then transformed into a format suitable for loading into a data mart. In the present embodiment, an analytic data interface receives the data having a common structure and transforms the data for loading into a data warehouse. The data can then be loaded into a data warehouse.

In the present embodiment, the analytic data interface includes a graphical user interface that makes it easy to configure and customize how business data is loaded into an analytic applications system such as a data warehouse. The analytic data interface includes a simplified abstraction layer for the data warehouse administrator, allowing the warehouse administrator to configure how data is loaded into the analytic applications in a fraction of the time it takes to configure these capabilities programmatically as occurs in prior art systems. In addition, most of the complex technical problems are solved prior to data entering the analytic data interface. In many instances, these technical problems are solved without any required configuration or analysis by the warehouse administrator. This greatly simplifies the task of loading data into a data warehouse, saving significant expense and time.

The benefits are particularly apparent for companies that use multiple different operational databases. More particularly, there is no need to define and program for data transport for each different operational database. The warehouse administrator needs only define and program for data transport a single time using the graphical user interface of the analytic data interface.

Accordingly, the present invention provides a method and apparatus that allows for transporting data such that the data can be used in data warehousing applications. In addition, the present invention provides a method and apparatus that takes advantage of the standardization of database components. Moreover, the present invention provides a method and apparatus that reduces the time required to define and program data transport for data warehousing applications.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the present invention and, together with the description, serve to explain the principles of the invention.

DETAILED DESCRIPTION

An apparatus and method for transporting data to a data warehousing application is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "extracting," "translating," "loading," "processing," "transforming," "storing" or the like, can refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices.

Figure 1:
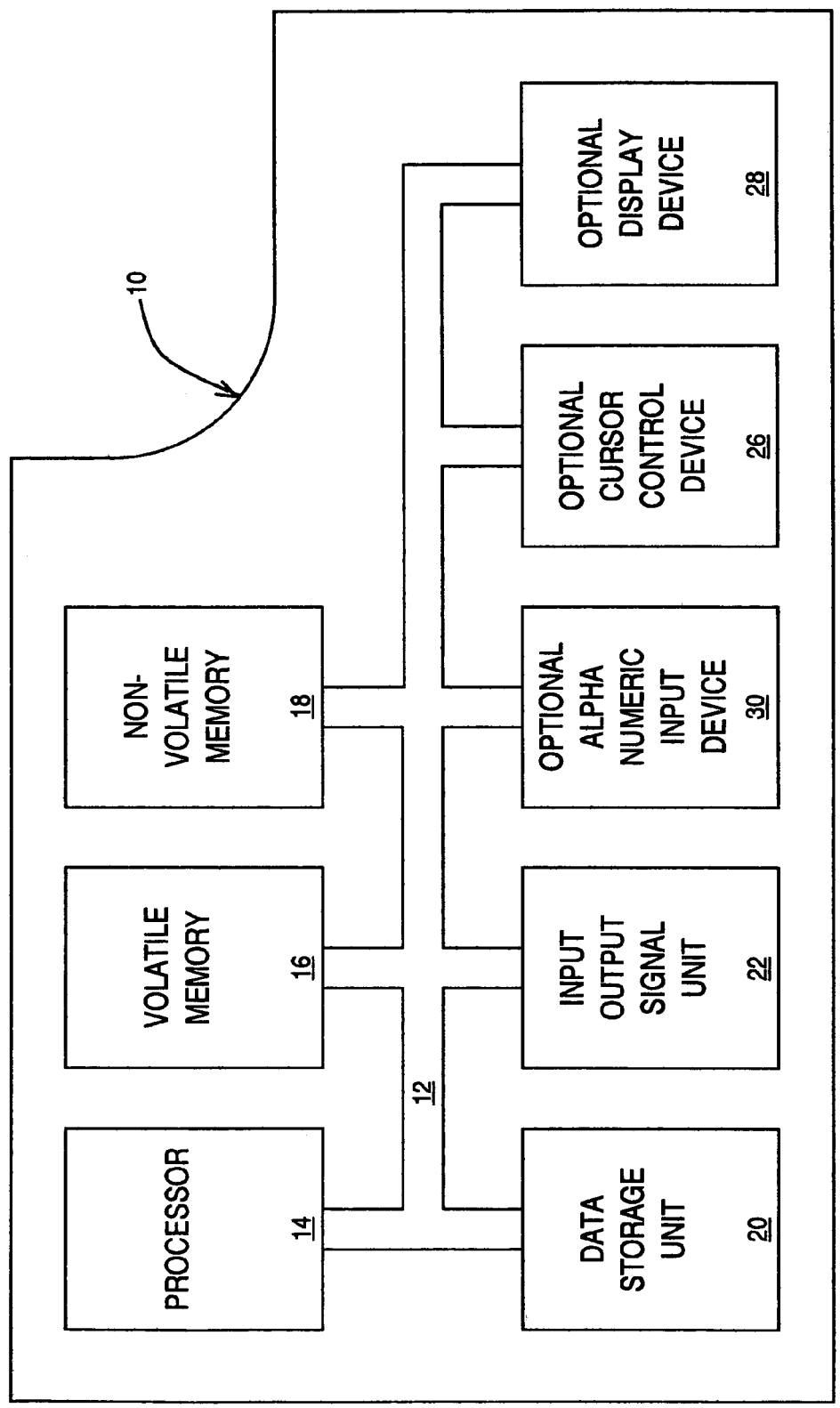
FIG. 1 illustrates an exemplary computer system used as part of a data warehousing system in accordance with one embodiment of the present invention.

With reference to FIG. 1, portions of the present invention are comprised of the computer-readable and computer executable instructions which reside, for example, in computer system 10 used as a part of a data warehousing system in accordance with one embodiment of the present invention. It is appreciated that system 10 of FIG. 1 is exemplary only and that the present invention can operate within a number of different computer systems including general-purpose computer systems, embedded computer systems, and stand-alone computer systems specially adapted for data warehousing applications. Computer system 10 includes an address/data bus 12 for conveying digital information between the various components, a central processor unit (CPU) 14 for processing the digital information and instructions, a main memory 16 comprised of volatile random access memory (RAM) for storing the digital information and instructions, a non-volatile read only memory (ROM) 18 for storing information and instructions of a more permanent nature. In addition, computer system 10 may also include a data storage unit 20 (e.g., a magnetic, optical, floppy, or tape drive) for storing vast amounts of data, and an I/O interface 22 for interfacing with peripheral devices (e.g., computer network, modem, mass storage devices, etc.). It should be noted that the software program for performing the transport process can be stored either in main memory 16, data storage unit 20, or in an external storage device. Devices which may be coupled to computer system 10 include a display device 28 for displaying information to a computer user, an alphanumeric input device 30 (e.g., a keyboard), and a cursor control device 26 (e.g., mouse, trackball, light pen, etc.) for inputting data, selections, updates, etc.

Furthermore, computer system 10 may be coupled in a network, such as in a client/server environment, whereby a number of clients (e.g., personal computers, workstations, portable computers, minicomputers, terminals, etc.), are used to run processes for performing desired tasks (e.g., inventory control, payroll, billing, etc.).

Figure 2:
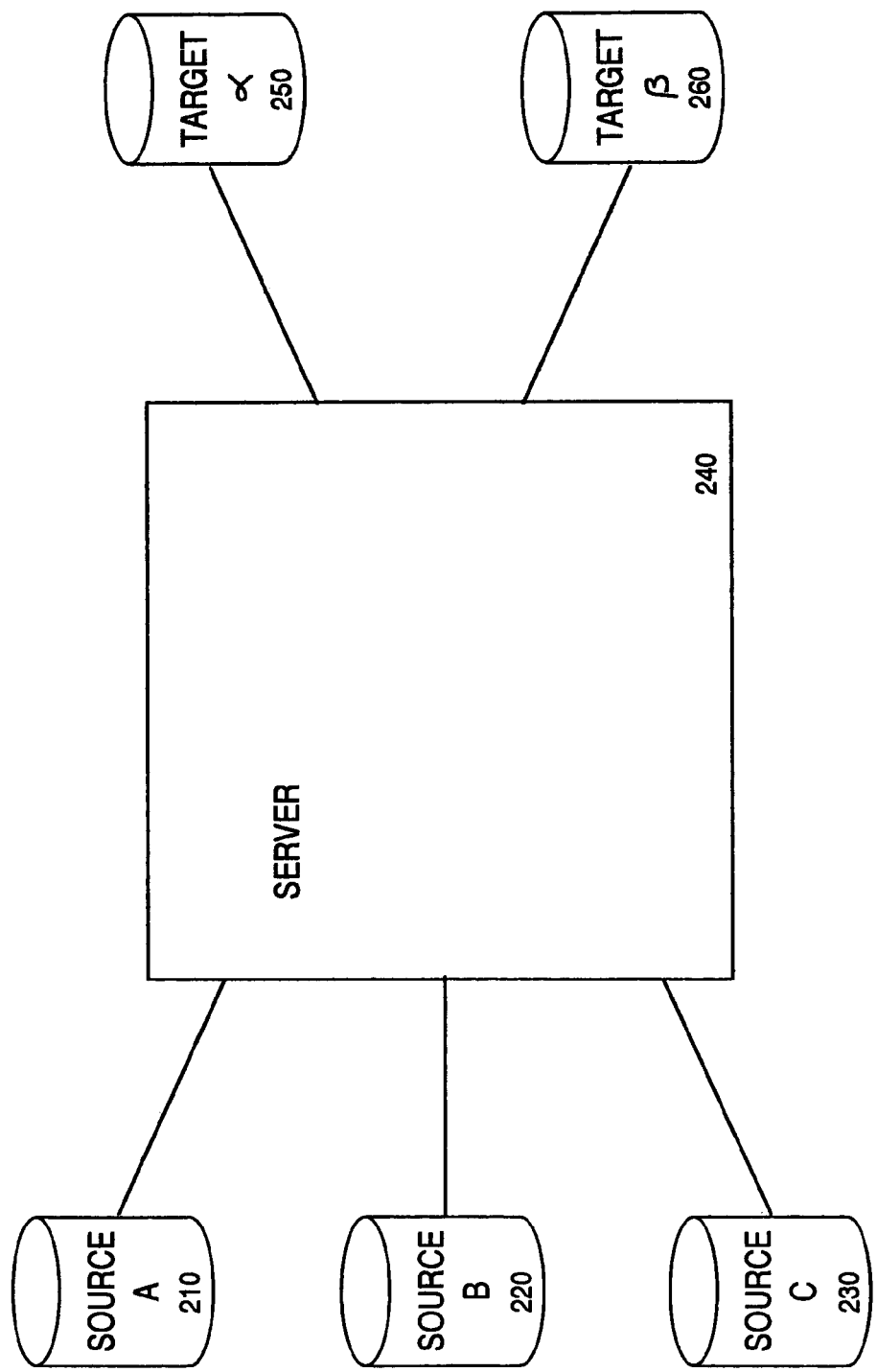
FIG. 2 illustrates an exemplary architecture that includes a server in accordance with one embodiment of the present invention.

FIG. 2 illustrates an exemplary computer network upon which an embodiment of the present invention may be practiced. Operational databases 210, 220, and 230 store data resulting from business and financial transactions, and/or from equipment performance logs. These databases can be any of the conventional RDMS systems (such as from Oracle, Informix, Sybase, Microsoft, Ariba, SAP, Web Logs, etc.) that reside within a high capacity mass storage device (such as hard disk drives, optical drives, tape drives, etc.). Databases 250 and 260 are the data warehouses or data marts that are the targets of the data transportation process.

In the present embodiment, software operable on server 240 performs data transport operations. That is, in the present embodiment, data from databases 210, 220, and 230 is extracted, transformed, and loaded by server 240 into databases 250 and 260. In the present embodiment, server 240 includes multiple microprocessors and data warehousing related software that operates in conjunction with an installed operating program such as, for example, Windows, NT, UNIX, etc.

Figure 3:
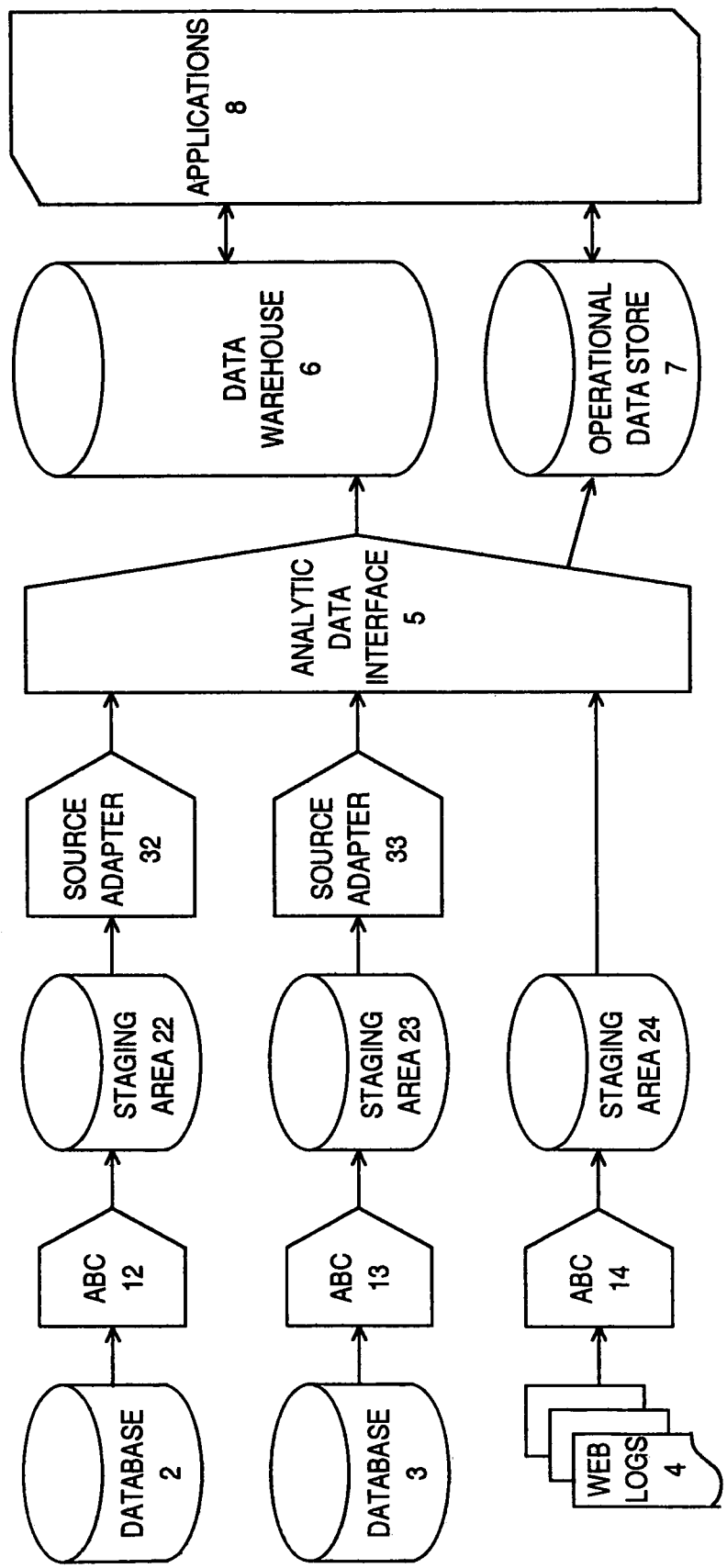
FIG. 3 illustrates an exemplary architecture that includes an analytic data interface in accordance with one embodiment of the present invention.

FIG. 3 shows an embodiment of the present invention that includes Analytic Business Components (ABCs) 12–14 that extract data from sources of data (e.g. databases 2–3 and web logs 4). Typically, sources contain data in the form of relational tables, Enterprise Resource Planning (ERP) objects, or flat files. Analytic business components 12–14 also translate operational data from each source of data into meaningful business terms. These business terms are then stored in staging areas 22–24.

Staging areas 22–24 hold data received from analytic business components 12–14. In the present embodiment, staging areas 22–24 consolidate data from disparate systems. The staging area denormalizes data where necessary, preparing it for storing in a data warehouse. More particularly, data is cleansed and remains formalized, tables from different databases are joined, and a refresh policy is carried out.

Continuing with FIG. 3, staging areas 22–24 provide a structure that is flexible to allow for user configuration. The only structures that are not configurable are the primary key columns. In the present embodiment, staging areas 22–24 are not organized by subject area, and are not customized for viewing or reporting by end users. Out of the box, the staging area tables consist of all fields required by the analytic data interface 5, including all extension fields. In one embodiment, the default database for the staging area is oracle. However, at implementation, the database type can be changed.

The use of staging areas 22–24 provide for quick and efficient data extract. This minimizes the time required for loading the database, allowing for a smaller operational window. In addition, the staging area prepares the data consistently for loading into the analytic data interface from various sources.

Continuing with FIG. 3, source adapters 32–33 convert source-specific terminology into analytic data interface terminology. Source adapters are provided for each source with the exception of web logs, which do not require any further source-specific conversion. In the present embodiment, source adapters 32–33 combine extract-specific staging area objects into the analytic data interface 5. In the present embodiment, source adapters 32–33 combine staging area objects to match up the inputs and their interrelationship as required by the analytic data interface 5.

Analytic data interface 5 transforms data for loading into data warehouse 6 for use in applications 8. In the present embodiment, the analytic data interface cleans data by enforcing commonalties in dates, names and other data types that appear across multiple systems and prepares it for the source-independent data warehouse.

In the present embodiment, analytic data interface 5 includes a graphical user interface that makes it easy to configure and customize how business data is loaded into an analytic applications system such as a data warehouse 6. Analytic data interface 5 includes a simplified abstraction layer for the data warehouse administrator, allowing the warehouse administrator to configure how data is loaded into the analytic applications in a fraction of the time it takes to configure these capabilities programmatically as occurs in prior art systems. In addition, most of the complex technical problems are solved prior to data entering the analytic data interface. Often these technical problems are solved automatically by the preconfigured programming of the analytic business components without any required configuration or analysis by the warehouse administrator. This greatly simplifies the task of loading data into a data warehouse, saving significant expense and time.

In one embodiment of the present invention, analytic business components 12–14, source adapters 32–33, and analytic data interface 5 are implemented as maplets within the warehouse designer. In this embodiment, staging areas 42–43 exists as targets in the warehouse designer.

An analytic applications system is illustrated that includes data warehouse 6, operational data store 7 and applications 8. It is appreciated that the method and apparatus of the present invention is well adapted for transporting data to any of a number of different types of analytic applications systems. For example, the present embodiment in well adapted for transporting data to an analytic applications system that includes a data mart and analytic applications systems having different structures and configurations.

Continuing with FIG. 3, in the present embodiment, data warehouse 6 includes a bus architecture and dimensional data models with conformed dimensions and facts for star schema analysis of data. In addition, data warehouse 6 includes support for slowly changing dimensions with effective dates for type II slowly changing dimensions. Moreover, data warehouse 6 includes pre-packaged dimensions (e.g. time, time of day, IP addresses, etc.), and provision for intelligent extension fields, normalized measures, aggregate tables, and analytic fields with additional complex measures. In the present embodiment, data warehouse 6 is packaged as targets in a warehouse designer.

Operational data store 7 consolidates and stores references data for loading into data warehouse 6. In the present embodiment, operational data store 7 retains customized, source-specific fields that will not exist in data warehouse 6 such as reference data to help standardize other formats (e.g. zip codes, currency conversion rates, and product-code to product-name translations).

Continuing with FIG. 3, applications 8 include data warehousing applications. In the present embodiment applications 8 include pre-packaged analytic tools that provide queries and reports for evaluating business performance such as, for example, applications built on the Power Center™ data integration platform made by Informatica Corporation of Palo Alto, Calif. In the present embodiment, applications 8 include programs that allow for drill-down capability, drill-up capability and drill-across capability. In addition, applications 8 allow for the performance of more detailed analysis using a multi-dimensional approach (sliceand -dice capability). Moreover, in the present embodiment, applications 8 include a user interface with web analytic capabilities that allows for generating standard reports and that includes ad-hoc query tools (that allow for drag and drop of measurements and dimensions to create custom reports).

In the present embodiment, applications 8 are pre-configured with some aggregate tables on commonly used dimensions and facts. However, these default aggregate tables can be changed based on specific business needs. Aggregate tables contain pre-calculated pre-stored summaries that are stored in the data warehouse to improve query performance.

Figure 4:
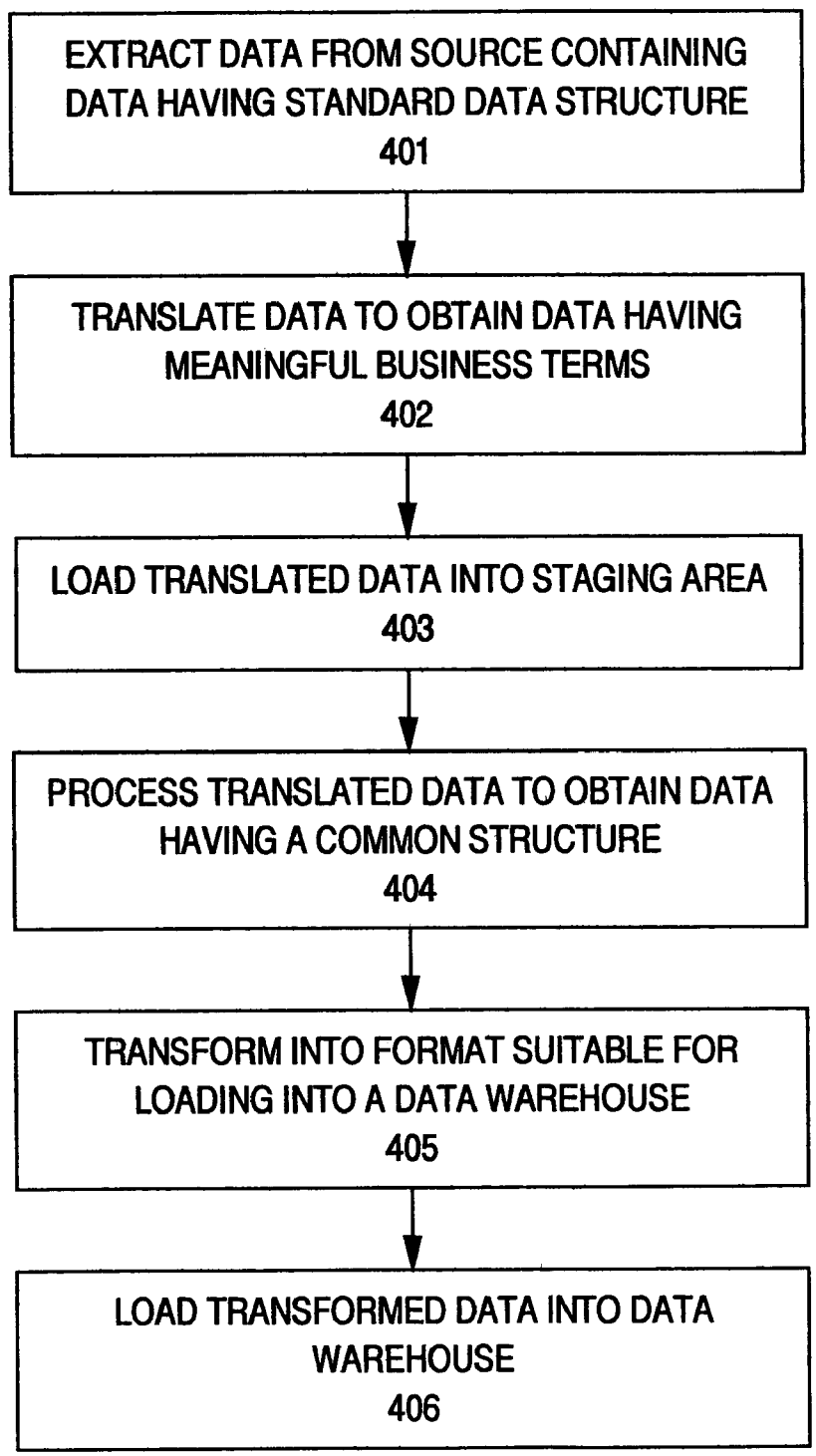
FIG. 4 shows a method for transporting data to a data warehousing application in accordance with one embodiment of the present invention.

FIG. 4 shows a method 400 for transporting data for a data warehousing application. In one embodiment of the present invention, method 400 is performed by server 240 of FIG. 2 which includes some or all of the components of computer 1 of FIG. 1. In another embodiment, the structure of FIG. 3 is used to perform method 400.

As shown by step 401, data is extracted from one or more source containing data having a standard data structure. In the embodiment shown in FIG. 2, data is extracted from databases 210, 220, and 230 by server 240. In the embodiment shown in FIG. 3, analytic business components 12–14 are operable to extract data from data sources 2–4. More particularly, analytic business component 12 extracts data from database 2. Similarly, analytic business component 13 extracts data from database 3 and analytic business component 14 extracts data from web logs 4.

Data is then translated as shown by step 402. In one embodiment of the present invention, step 402 is performed by server 240 of FIG. 2. In another embodiment, analytic business components 12–14 of FIG. 3 translate the data extracted in step 401 in order to produce translated data that contains meaningful business terms. More particularly, analytic business component 12 translates data from database 2. Similarly, analytic business component 13 translates data from database 3 while analytic business component 14 translates data from web logs 4.

Continuing with FIG. 4, in the present embodiment, analytic business components 12–14 are source-specific. That is, each analytic business component is adapted to extract and translate data from a specific type of database standard data structure. Thus, for example, if database 2 is an Ariba database, analytic business component 12 is an analytic business component for an Ariba database. Similarly, if database 3 is a SAP database, analytic business component 13 is an analytic business component for a SAP database. In an embodiment in which database 4 includes web logs analytic business component 14 is an analytic business component adapted to extract and translate web logs.

The translation process hides the complexity of the source systems (e.g. databases 2–3 and web logs 4). In the present embodiment, analytic business components 12–14 perform joins in the data source that help to present the data in simple business terms. In addition, the analytic business components 12–14 present the source fields in form that is understandable to the user. For example, for SAP, business components 12–14 provide English descriptions.

In the present embodiment, analytic business components 12–14 can be customized at implementation to provide additional business abstractions over and above those business abstractions preprogrammed into analytic business components 12–14. Moreover, analytic business components 12–14 encapsulate extraction logic as they move data from its source.

The translated data is then loaded into staging areas as shown by step 403. In the embodiment of FIG. 2, the translated data is loaded into staging areas stored on server 240. In the embodiment shown in FIG. 3, the translated data is loaded into staging areas 22–24. More particularly, analytic business component 12 loads translated data into staging area 22. Similarly, analytic business component 13 loads translated data into staging area 23 and analytic business component 14 loads translated data into staging area 24.

As shown by step 404, the translated data is processed to obtain data having a common structure. In the embodiment shown in FIG. 2, server 240 is operable to process the translated data to obtain data having a common structure.

In the embodiment shown in FIG. 3, the processing of step 404 converts source-specific terminology into analytic data interface terminology. In the present embodiment, staging area objects are combined to match up the inputs and their interrelationship as required by the analytic data interface 5.

Following are several specific examples of the conversion of source-specific terminology that is processed into analytic data interface terminology. It is appreciated that these examples are exemplary and that other source specific data is processed to be compatible with the inputs of the analytic data interface 5. Data indicators and data indicator flags are configured based on the data. Physical deletions are performed and a delete flag is set to provide a common way to flag a record to be deleted. In addition, data type conversion and source-related clean up are performed. Also, unique key identification is configured based on the source and its data to take care of problems arising from the fact that the number of keys differ in each source. In the present embodiment, the set of rows that will be put in the data warehouse is also determined.

In the embodiment shown in FIG. 3, source adapters 32–33 are operable for processing the translated data within staging areas 22–23 to obtain data having a common structure. More particularly, source adapters 32–34 convert source-specific terminology into analytic data interface terminology. Source adapters are provided for each source with the exception of web logs, which do not require any further source-specific conversion. In the present embodiment, source adapters 32–33 combine extract-specific staging area objects into the analytic data interface 5. In the present embodiment, source adapters 32–33 combine staging area objects to match up the inputs and their interrelationship as required by the analytic data interface 5.

Continuing with step 404 of FIG. 4, in the present embodiment source adapters 32–33 set the delete flag. More particularly, because each source handles deletes differently, there is a need to provide a uniform delete flag to the analytic data interface. To meet this need, source adapters 32–33 handle physical deletions and delete indicators and provide a common way to flag a record to be deleted.

In the present embodiment source adapters 32–33 handle data type conversions. More particularly, because the same concepts are represented differently in each source, there is a need to provide data type conversion. In the present embodiment, source adapters 32–33 publish the structure of each field and convert the data type using a consistent approach. In addition, source adapters 32–33 handle any source-related clean up.

Continuing with FIG. 3, in the present embodiment source adapters 32–33 configure unique key identification based on the source and its data. This takes care of problems arising from the fact that the number of keys differ in each source.

Now referring to FIG. 4, the data having a common structure is transformed into a format suitable for loading into an analytic applications system such as a data warehousing application. In the present embodiment, the data having a common structure is transformed into a format suitable for loading into a data warehouse as shown by step 405. In the embodiment shown in FIG. 2, server 240 is operable to transform the data having a common structure into a format suitable for loading into a data warehouse.

In the present embodiment step 405 includes consolidation of business concepts into integrated structures that are suitable for querying and reporting. In addition, source definitions differences are normalized into a single, common definition. In the present embodiment, step 405 includes, for example, code lookup (e.g. currency conversion, unit of measure conversion and code to description field resolution), data-driven updates, intelligent expansion fields, dimension table specific features, fact table specific features, key resolution, key generation, and "bad" data flagging. In the present embodiment, the user can also insert, update, or reject a determination.

In the embodiment shown in FIG. 3, analytic data interface 5 is operable to transform data received from source adapters 32–33 and staging area 24 into a format suitable for loading into a data mart. In the present embodiment, analytic data interface 5 provides complex transformation logic that integrates data in two ways. First, business concepts are consolidated across an entire value chain into integrated structures that are suitable for querying and reporting. In addition, the analytic data interface 5 provides complex transformation logic that normalizes source definitions differences into a single, common definition. Some of the transformation logic performed in the analytic data interface 5 include codes lookup (e.g. currency conversion, unit of measure conversion and code to description field resolution) and data-driven updates. In addition, intelligent expansion fields that extend out of the box capability such as pass through fields, codes fields, dare fields, money fields. Also, in the present embodiment, the analytic data interface includes dimension table specific features (e.g. surrogate key generation, slowly changing dimension support, and support for effective dates), fact table specific features (e.g. support for exchange rate lookup and support for dimension key lookup), key resolution, key generation, "bad" data flagging. In the present embodiment, the analytic data interface allows a user to insert, update, or reject a determination.

In the present embodiment, analytic data interface 5 includes slowly changing dimension logic for tracking historically important data. A historically significant attribute is one that you want to retain for your records, even if subsequent records show that a change has been made. In the present embodiment, records within analytic data interface 5 can be configured using two different types of slowly changing dimension categories: historically insignificant attributes (Type 1 slowly changing dimensions) and historically significant attributes (Type 2 slowly changing dimensions). For type 1 slowly changing dimensions, the data field is simply overwritten. Although type 1 slowly changing dimensions does not maintain history, it is the simplest and fastest slowly changing dimension. Type 1 slowly changing dimension is used when the old value of the changed dimension is not deemed important or of interest to track, or is a historically insignificant attribute. For example, a user may want to use type 1 when changing incorrect values in a field. This way, there is no information for that record based on incorrect values. For example, when state name in a supplier table is a type 1 slowly changing dimension, upon changes to the state in which a supplier is located in, the previous value is overwritten (the previous state name) and the previous value is not saved.

Type 2 slowly changing dimensions create a new record. This is the most common slowly changing dimension because it allows the user to track history. The old record allows for pointing to all history prior to the change, and the new record points to all history after the change. Because each change generates a new record, old and new records allow for partition history exactly. In the previous example, when state name in a supplier table is a type 2 slowly changing dimension, upon changes to the state in which a supplier is located in, a new, current record is generated. The previous value remains a record, and the new current record is a separate record.

The slowly changing dimension logic of the present invention gives four types of records that are stored in the staging area, new records, changed records with data that is not historically tracked, changed records having historical significance, and changed records having historical significance, and changed records whose changes have no significance of any kind.

In one embodiment, a new customer key is used for the old sales record while the old customer key continues to be used for the new record. By assigning a new customer key, there is no need for a new addition to the customer table. A simple overwrite of the record showing the new combination suffices. As changed slowly changing dimension records come into a fact and dimension tables, the dimension table key is resolved only when both of the following facts are true: the key does not already exist in the data mart, and the key resolution attributes of the fact change.

In the present embodiment, a predetermined alphanumeric character is used to indicate a need for data cleansing. That is, because most analytic data interface fields are mapped to fields in the transaction system, be it Ariba, ORMS or SAP, some fields may not be populated with values. For instance, a row in the supplier table may have information on a supplier's address, but may have no value in the supplier's region field. If a report is run on supplier prices by region, the suppliers for whom region information is missing would normally be excluded. However, analytic data interface 5 provides a feature to identify all occurrences of missing values. In the present embodiment the identifier for missing values is a question mark ("?"). When the missing value fields are populated with the question mark, and a report is run on supplier prices by region, the suppliers for whom region information was missing are shown under a region identified by the character "?." The question mark is a sign that the organization's data needs to be "cleansed."

Cleansing the data in this case involves drilling into the category marked as "?" to learn, perhaps the supplier names or numbers within that group. The data warehouse administrator can then correct each of those suppliers by entering in the regional information on the back end.

In the present embodiment, the logic for populating null fields is in the analytic data interface 5. More particularly, the analytic data interface looks for columns that are both linked to a character data type and that are null, and populates them with a "?." It is appreciated that the use of a character such as a question mark is simply the default setting to represent missing data. The present invention is well adapted for using a different character or multiple characters.

Because the data input into analytic data interface 5 has a common structure, there is no need to process data from each data source independently. More particularly, the data received at analytic data interface 5 has already been translated to obtain meaningful business terms (step 402) and has been processed to obtain data having a common structure (step 404). Therefore, the data from different sources (e.g. databases 2–3 and web logs 4) can be treated as a single data source for the purpose of transformation (step 405).

In the present embodiment, because the analytic data interface includes a graphical user interface, it is easy to configure and customize how business data is loaded into an analytic applications system such as a data warehouse. In addition, because the analytic data interface includes a simplified abstraction layer for the data warehouse administrator, the warehouse administrator can configure how data is loaded into the analytic applications in a fraction of the time it takes to configure these capabilities programmatically. In addition, because most of the complex technical problems are solved prior to data entering the analytic data interface, without any required configuration or analysis by the warehouse administrator, the task of configuring data is greatly simplified. Thus, the present invention greatly simplifies the process of loading data into a data warehouse, saving significant expense and time.

The benefits are particularly apparent for companies that use multiple different operational databases. More particularly, there is no need to define and program for data transport for each different operational database. The warehouse administrator needs only define and program for data transport a single time using the graphical user interface of the analytic data interface.

In the present embodiment, maplets (reusable objects that represent a set of transformations) are used for code lookup, for address lookup, and for extraction. Also, maplets are used to identify all business locations and identify all business hierarchical structures.

The transformed data is loaded into an analytic applications system such as a data warehousing application. In the embodiment shown in FIG. 4, the data is loaded into a data warehouse as shown by step 406. In the embodiment shown in FIG. 2, the data is loaded into target databases 250–260 which can be databases of a data warehouse. In the embodiment shown in FIG. 3, the data is loaded into data warehouse 6. In addition, in the present embodiment, data is also loaded into operational data store 7. Applications 8 then extract data from data warehouse 6 and operational data store 7 for performing analysis.

The method and apparatus of the present invention are illustrated in the following example in which database 2 is an Ariba database and database 3 is a SAP database. In this embodiment, analytic business component 12 is an analytic business component for an Ariba database and analytic business component 13 is an analytic business component for a SAP database. Thus, staging area 32 will contain data from an Ariba database that has been translated in order to include meaningful business terms, staging area 33 will contain data from an SAP database that has been translated in order to include meaningful business terms. Similarly, staging area 34 will contain data from web logs that has been translated in order to include meaningful business terms. In this embodiment, source adapter 32 will be an Ariba source adapter and source adapter 33 will be a SAP source adapter while no source adapter is required for data from web logs 4. Because the data from each of sources 2–4 is provided to analytic data interface 5, the data can be treated as a common data source for the purpose of transforming the data into a format suitable for loading into a data warehousing application (step 405 of FIG. 4). Therefore, the warehouse administrator needs only define and program for data transport a single time using the graphical user interface of the analytic data interface. Not three separate times as would be required by prior art systems.

Accordingly, the present invention provides a method and apparatus that allows for transporting data such that the data can be used in data warehousing applications. In addition, the present invention provides a method and apparatus that takes advantage of the standardization of database components. Moreover, the present invention provides a method and apparatus that reduces the time required to define and program data transport for data warehousing applications.

While the present invention has been described in particular embodiments, it should be appreciated that the present invention should not be construed as limited by such embodiments, but rather construed according to the below claims.

The invention claimed is:

1. A method for tracking historical data from different sources, comprising:
   processing source-specific data originating at sources with disparate formats into source-independent data with a single, common format;
   storing the source-independent data;
   automatically determining dimensions of the stored data having historically significant attributes;
   in response to a change to a dimension having a historically significant attribute, creating a historical record of the change, wherein creating a historical record of the change further comprises:
      creating a first record for the stored dimension having a historically significant attribute;
      generating a first key;
      associating the first key with the first record;
      creating a second record to store the change to the dimension having a historically significant attribute;
      re-associating the first key with the second record;
      generating a second key; and
      associating the second key with the first record.

2. The method of claim 1, further comprising:
   in response to a change to a dimension without a historically significant attribute, overwriting the dimension.

3. The method of claim 1, wherein processing source-specific data originating at sources with disparate formats into source-independent data with a single, common format further comprises:
   performing source-related clean up.

4. The method of claim 1, wherein processing source-specific data originating at sources with disparate formats into source-independent data with a single, common format further comprises:
   configuring unique key identification information.

5. A computer program product for tracking historical data from different sources, comprising:
   a computer-readable medium; and
   computer program code, encoded on the medium, for controlling a computer system to perform the operations of:
      processing source-specific data originating at sources with disparate formats into source-independent data with a single, common format;
      storing the source-independent data;
      automatically determining dimensions of the stored data having historically significant attributes; and
      in response to a change to a dimension having a historically significant attribute, creating a historical record of the change by:

creating a first record for the dimension having a historically significant attribute;
generating a first key;
associating the first key with the first record;
creating a second record to store the change to the dimension having a historically significant attribute;
re-associating the first key with the second record;
generating a second key; and
associating the second key with the first record.

6. A system for tracking historical data from different sources, comprising:
a source adapter for processing source-specific data originating at sources with disparate formats into source-independent data with a single, common format; and
an analytic data interface for storing the source-independent data, automatically determining dimensions of the stored data having historically significant attributes, and creating a historical record of a change to a dimension having a historically significant attribute, wherein the analytic data interface further comprises:
a record generation module for creating a first record for the dimension having a historically significant attribute and creating a second record to store the change to the dimension having a historically significant attribute;
a key generation module for generating a first key and a second key to uniquely identify records; and
an association module for associating the first key with the first record, re-associating the first key with the second record, and associating the second key with the first record.

7. The computer program product of claim 5, further comprising computer program code, encoded on the medium, for controlling a computer system to perform the operation of, in response to a change to a dimension without a historically significant attribute, overwriting the dimension.

8. The system of claim 6, wherein the analytic data interface is further configured for, in response to a change to a dimension without a historically significant attribute, overwriting the dimension.

* * * * *

UNITED STATES PATENT AND TRADEMARK OFFICE
CERTIFICATE OF CORRECTION

PATENT NO. : 7,117,215 B1  Page 1 of 1
APPLICATION NO. : 09/877370
DATED : October 3, 2006
INVENTOR(S) : Kanchwalla et al.

It is certified that error appears in the above-identified patent and that said Letters Patent is hereby corrected as shown below:

On the title page item (56),
Page 2, U.S. PATENT DOCUMENTS,

Column 1,
Delete reference "6,268,663 B1   7/2001    Itabashi et al."

On the title page item (56), line 25,
Column 2,
Replace "6,591,304 B1      7/2003     Sitaraman et al." with
        --6,491,304 B2     12/2002    Sato et al.--

On the title page item (56), line 40,
Replace "2003/0172247 A1  9/2003    Bayer et al."    with
        --2002/0172247 A1  11/2002   Sopra et al.--

Signed and Sealed this

Second Day of January, 2007

JON W. DUDAS
*Director of the United States Patent and Trademark Office*